United States Patent [19]

Parkinson et al.

[11] 4,139,430
[45] Feb. 13, 1979

[54] PROCESS OF ELECTRODEPOSITION AND PRODUCT UTILIZING A REUSABLE INTEGRATED CATHODE UNIT

[76] Inventors: Ronald Parkinson, 16 Courtham Ave., Thornhill, Ontario; Richard A. Sinton, 41 Inniswood Dr., Scarborough, Ontario, both of Canada

[21] Appl. No.: 866,856

[22] Filed: Jan. 4, 1978

Related U.S. Application Data

[62] Division of Ser. No. 738,148, Nov. 26, 1976, Pat. No. 4,082,641.

[30] Foreign Application Priority Data

Apr. 1, 1976 [GB] United Kingdom ............... 13340/76

[51] Int. Cl.² ......................... C25C 1/06; C25C 1/12
[52] U.S. Cl. .................................... 204/108; 204/112
[58] Field of Search ................ 204/3, 4, 12, 08, 112, 204/113

[56] References Cited

U.S. PATENT DOCUMENTS

| | | | |
|---|---|---|---|
| 1,313,246 | 8/1919 | Antisell | 204/108 |
| 3,419,901 | 12/1968 | Nordblom | 204/10 |
| 3,577,330 | 5/1971 | Knapp et al. | 204/112 |
| 3,622,284 | 11/1971 | Bart | 29/191.4 |
| 3,668,081 | 6/1972 | Borner | 204/12 |
| 3,860,509 | 1/1975 | Emmett, Jr. | 204/281 |
| 4,040,915 | 8/1977 | Fisher | 204/12 |

FOREIGN PATENT DOCUMENTS 955195 9/1974 Canada.
178994 4/1966 U.S.S.R.

*Primary Examiner*—T. M. Tufariello
*Attorney, Agent, or Firm*—Ridout & Maybee

[57] ABSTRACT

A reusable integrated cathode unit and an associated electrolytic method are disclosed for the simultaneous production of a multiplicity of metal electrodeposits by plating from a base metal electrolyte. The rigid cathode unit has two integrated components, a slab of non-conductive material and a metal assembly which is embedded therein. The metal assembly has projections that penetrate the slab surface at spaced locations thereby forming an array of conductive metal islands flush with or raised above the surface of the cathode unit which serve as the sites for plating of the electrodeposits. The method is advantageously characterized by the production of unique, crown shaped electrodeposits with basal areas much larger than the areas of the conductive islands on which they are formed, and a significant component of growth in a direction normal to the plating surface. Following a single electrodeposition cycle, the electrodeposits are readily recovered from the cathode unit, the latter being recycled to the electrolytic operation. The sequence is repeated many times, without interruption for repair, as a result of the rugged physical properties of the cathode unit which provide for an extremely long service life.

5 Claims, 12 Drawing Figures

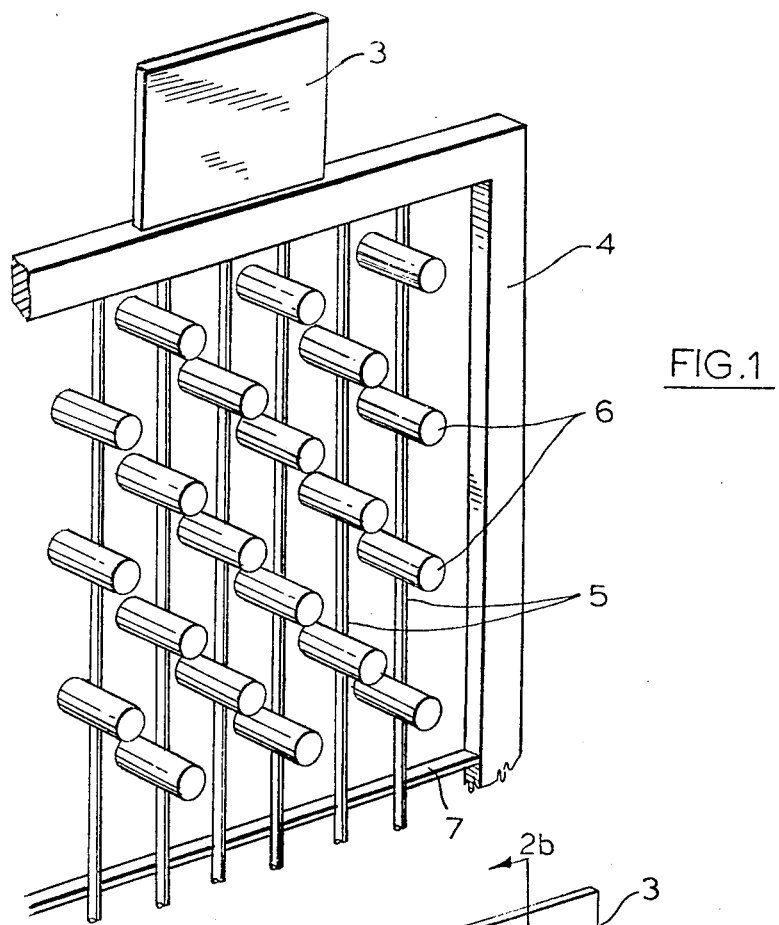
FIG.1
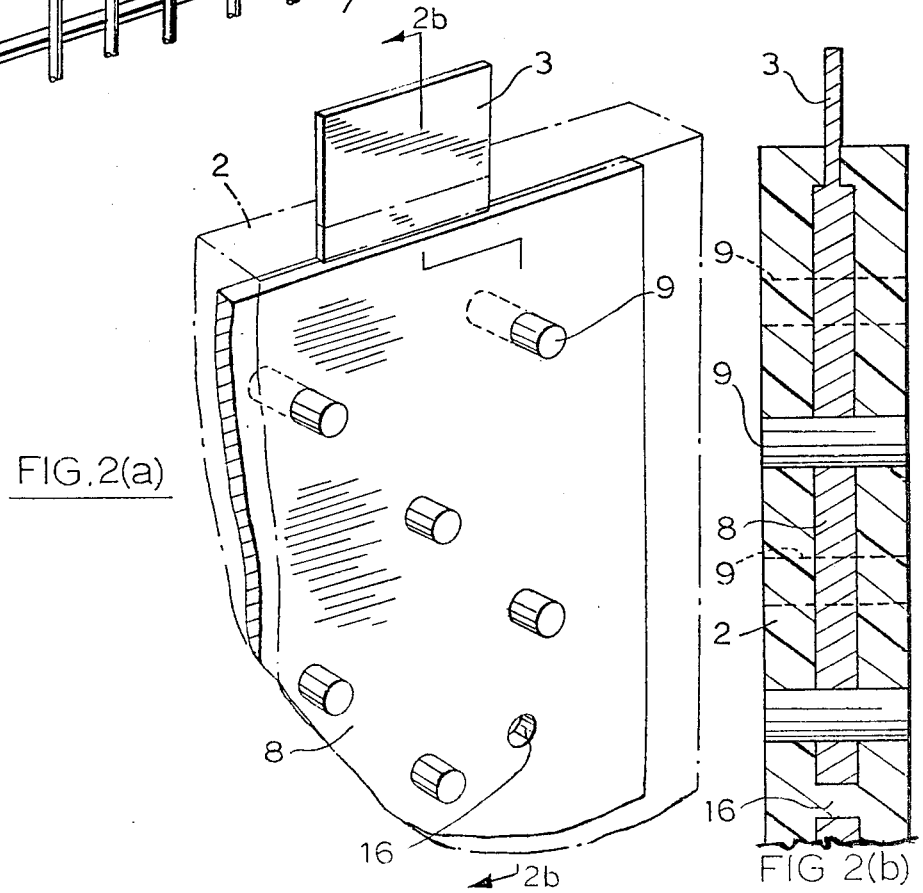
FIG.2(a)
FIG 2(b)

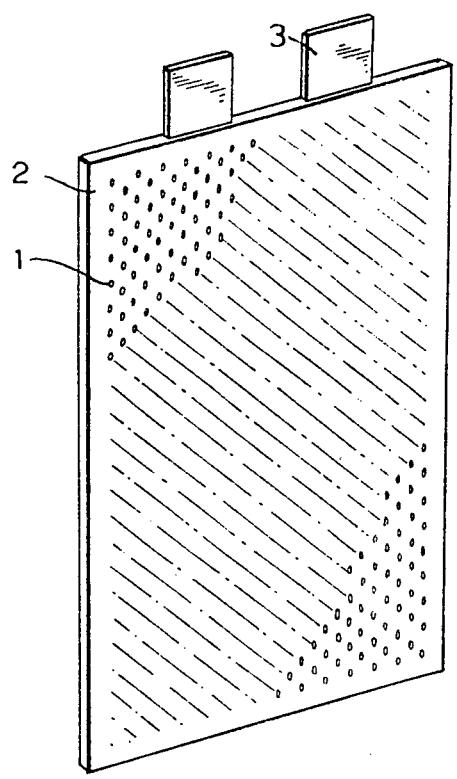
FIG.5
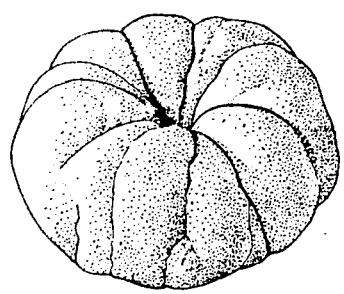 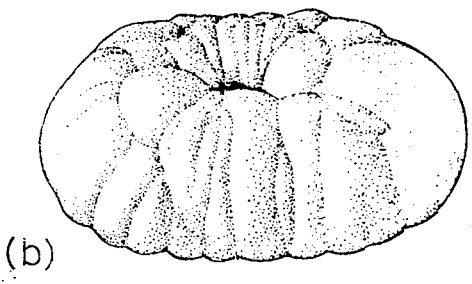
(a) (b)
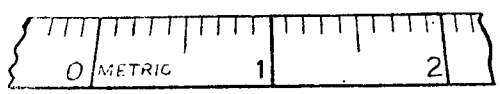 
FIG.6
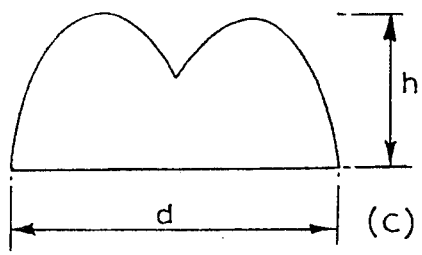 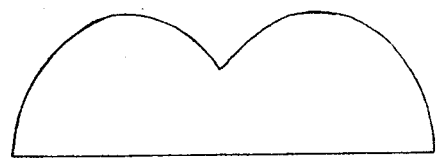
(c) (d)

PROCESS OF ELECTRODEPOSITION AND PRODUCT UTILIZING A REUSABLE INTEGRATED CATHODE UNIT

This application is a division of application Ser. No. 738,148, filed Nov. 26, 1976, now U.S. Pat. No. 4,082,641.

BACKGROUND OF THE INVENTION

1. Field

The present invention relates to the electrodeposition of metal and, in particular to the electrodeposition of metal from metal-bearing electrolyte by electrorefining or electrowinning. More particularly, the invention relates to the design and construction of an integrated cathode unit and a method for using same in the simultaneous electrodeposition of a multiplicity of separated metal deposits of similar size and shape.

2. Prior Art

In production-scale electrometallurgical practice, refined metal is recovered in large tonnages from solution by batch electrodeposition onto numerous cathode "starting sheets". Periodically, the cathodes, with accumulated metal, are removed from the tank and sheared into pieces which are sized for convenient handling in the secondary industries for which they are destined. This practice is labour intensive and methods have been described whereby individual deposits are produced by plating onto a modified cathode having conductive islands regularly spaced in an insulating background. The deposits are subsequently removed by mechanical stripping and the cathode is re-used.

This basic concept has been described in U.S. Pat. No. 3,860,509 where it has been used to generate fine, powderlike metal continuously on microscopic islands, but the technique disclosed therein is unsuitable for batch commercial applications where much larger deposits are involved.

For large deposits, the industry has found it necessary to compromise and, instead use batch plating on conventionally-sized rectangular cathodes having relatively large conductive islands. The metal is recovered by mechanical stripping and the cathode is re-used. The prior art relating to this field, as far as is known, is disclosed only in Canadian Pat. No. 955,195 and U.S. Pat. Nos. 3,577,330 and 3,668,081, and their equivalents in other countries.

It is obvious that the success of this new field of art is very much dependent on the ability of the reusable cathode to withstand repeated cycling through the plating and stripping operations. The conductive islands, typically at least ⅝" in diameter, are sufficiently large that the metal deposits, which correspond substantially in size to the conductive area, form a firm bond with the island. Indeed, a fragile bond must be avoided to prevent the loss of product into the electrolytic tank. Consequently, the stripping operation, which tears the metal product from the island, subjects the cathode to considerable mechanical wear over and above the vigorous handling it routinely encounters during transfer to and from the electrolytic tanks. It follows that cathodes for this application must be rugged, self-supporting structures capable of resisting the relatively rough treatment inherent in this industrial application.

A prior art cathode, of the type referred to in the three patents described above, consists of a conductive metal sheet partially covered with a thin coating of non-conductive material in such a pattern that selected isolated areas of the metal sheet remain exposed as conductive metal islands. The most serious drawback of these so-called "permanent cathode mandrels" is their short service life, which is generally only ten plating cycles or less. In any masking design, the conductive islands are inherently depressed in relation to the masking layer and, during electrodeposition, metal is deposited into the resulting cavity. The bond at the interface between the masking material and the underlying metal substrate is critical to the usefulness of the cathode in the metal stripping operation since, when deposits are removed, the mask is subjected to considerable abuse, particularly at the ridge where the mask surrounds the depressed islands. Where the masking material is torn away, the island is undesirably enlarged with the result that abnormal deposits form during subsequent electrodeposition which, on removal, destroy the coating even further. The deterioration is both rapid and cumulative and results in the cathode being withdrawn from service for re-masking within about ten electrodeposition cycles. The search for a suitable masking technique has ranged in an increasingly complex sequence from electroplating paints inks and tape in the early patents, to epoxies, applied to a chromium plated stainless steel sheet, in a later patent, and latterly to vitreous enamel layers. Each improvement identifies the vulnerable feature of the cathodes to be their inability to withstand repeated electrodeposition because of the deterioration of the mask.

It has now been found that by the use of a design and construction novel to this field of art, a reusable integrated cathode unit with conductive islands is provided that is rugged, durable, and more reliable than previous cathodes. At the same time, it has been found that the advantages of the integrated cathode unit of the present invention are not restricted solely to its physical attributes, but are also to be found in the simplicity it imparts to the electroplating method associated with its use and the improved properties of the electrodeposits so produced.

It is an object of the present invention to provide an integrated cathode unit for the simultaneous production of a multiplicity of metal electrodeposits thereon.

It is another object of the present invention to provide an integrated cathode unit that is highly resistant to physical damage during repeated electrodeposition and stripping cycles and is characterized by long life and low frequency of repair.

It is a further object of the present invention to provide a method which makes use of the integrated cathode unit in the production of metal electrodeposits of improved shape.

Other objects and advantages will become apparent from the following description.

SUMMARY OF THE INVENTION

Broadly speaking, the apparatus of the present invention is a rectangular reusable cathode unit having two working faces for the simultaneous batch electrodeposition thereon of a multiplicity of discrete metal deposits weighing at least 5 g but not more than 50 g, the cathode unit comprising an integrated whole of two interlocking parts, a substantially rigid slab of non-conductive material with a conductive metal assembly embedded therein, said assembly having projections at spaced locations that penetrate the surface of the slab thereby forming an array of solid, conductive metal islands, each metal island having a surface area of less than about 0.2 square inches and more than about 0.02 square inches and being flush with or raised above the surface of the slab and separated from each other sufficiently for the electrodeposition of metal deposits thereon, each of which has a basal area several times larger than that of the island on which is is deposited.

The invention also relates to a method for electrodepositing a multiplicity of metal electrodeposits from an electrolyte, said method characterized by:

i. employing in said electrolyte a rectangular reusable cathode unit having two working faces and comprising an integrated whole of two interlocking parts, a substantially rigid slab of non-conductive material with a conductive metal assembly embedded therein, said assembly having projections at spaced locations that penetrate the surface of the slab thereby forming an array of conductive metal islands that are flush with or raised above the surface of the slab for electrodeposition of metal deposits thereon, ii. passing electric current through the electrolyte, iii. electrodepositing metal on said cathode unit thereby producing metal deposits weighing at least 5 g but not more than 50 g, iv. removing the deposits from the cathode unit, v. re-using the cathode unit in the electrolyte for further metal electrodeposition.

Finally, the invention relates to a cathodically deposited metal product of substantially hemi-spherical or semi-ellipsoidal shape having a flat base of area A and a maximum height, h, measured perpendicularly from the flat base, the product weighing between 5 g and 50 g, having a total surface area at least three times that of its flat base and a ratio h/A of at least 0.3 in$^{-1}$.

BRIEF DESCRIPTION OF THE DRAWINGS

FIG. 1 is an isometric projection of a broken-away portion of one embodiment of the metal assembly that makes up one component of the cathode unit.

FIG. 2(a) is an isometric projection of a broken-away portion of a second embodiment of the metal assembly of the present invention showing the surrounding non-conductive material.

FIG. 2(b) shows an end view of FIG. 2(a).

FIG. 5 illustrates the integrated cathode unit generally contemplated by the present invention.

FIGS. 6(a) and (b) are reproductions of electrodeposits produced according to the method of the present invention.

FIGS. 6(c) and (d) are mid-point shape reproductions of sections of the electrodeposits shown in FIGS. 6(a) and 6(b).

DESCRIPTION OF THE PREFERRED EMBODIMENTS

Figure 3:
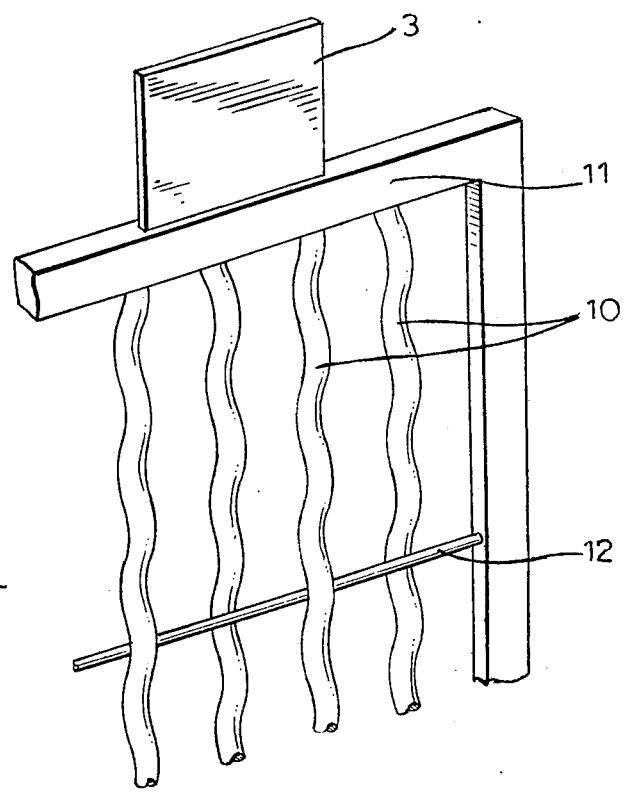
FIG. 3 is a broken away portion of an isometric projection of the metal assembly according to a third embodiment of the invention.

Three embodiments of the cathode unit are hereinafter referred to as the stud-wire, stud-plate and corrugated-wire embodiments.

The manufacture of an integrated cathode unit according to the stud-wire embodiment of the invention comprises, in part, the construction of an electrically conductive metal assembly such as that shown in FIG. 1. The assembly consists of a conductive frame 4 housing a series of conductive metal wires 5 to which are attached numerous solid cylindrical studs 6 each of which normally has a diameter up to about ½". It is preferred that the studs be regularly spaced and project in a direction normal to the plane in which the wires lie, but it will be appreciated that other arrangements and orientations of the studs are within the scope of the invention. The wires may receive nominal support from conductive cross-bars 7 until a later stage in the manufacturing process. Electrical contacts 3 are welded to this assembly as shown. The material chosen for the transport of current in the cathode can be any conductive metal that is inert to the electrolytic solution with which it is in contact. Nickel-chromium steels such as AISI type 304 stainless have been found particularly satisfactory in this regard. The metal wires should be thick enough to carry the current and diameters between ⅛" and ⅜" have been found most adequate. The number of studs on the metal assembly is selected to maximize the number of sites for metal deposition on the cathode unit while at the same time minimizing the space between product metal electrodeposits.

The metal assembly is embedded in a slab of non-conductive material such as a plastic. The term "plastic" will be used hereinafter in describing various embodiments of the invention since, as a group, plastics have been found to be the most convenient materials. It should be understood, however, that any substance is satisfactory that has the properties of being inert to the electrolyte, strong enough to withstand the normal wear and tear encountered in repeated service, and has a coefficient of expansion sufficiently compatible with the embedded metal to prevent serious separation of the two as a result of the changes of temperature encountered during manufacture or service. Numerous plastics have such suitable combination of properties including epoxies, polyurethanes, polypropylene, polyethylene and acrylics. Inert fillers such as glass or chemically active modifiers can also be used as required, to adjust the properties of the plastic material.

Embedding can be achieved by heating the plastic and causing it to flow around the assembly inside a rigid mould using the technique known as injection moulding. Alternatively, liquid resins can be poured into a mould cavity, or, two sheets of the plastic material with the metal assembly between them can be hot-pressed together. Whichever technique is used, the aim is to intimately merge the plastic with the metal assembly thereby forming the integrated cathode slab depicted in FIG. 5.

The end result is a rigid integrated slab cathode unit composed of two intimately merged complementary parts. With this design, the metal assembly and the non-conductive slab are mutually interlocked and inseparable. It will be appreciated, therefore, that the novel integrated design of the present cathode unit provides a ready solution to the prior art problem of bonding metal to non-conductive material.

A second embodiment of the invention (plate-stud) is characterized by the conductive metal assembly illustrated in isometric section in FIG. 2(a) and in end projection in FIG. 2(b). A conductive metal plate 8, with electrical connection 3, is provided with a series of solid cylindrical projections or studs, 9, which, in the embodiment shown in FIG. 2, are aligned with their axes normal to the plane of the plate. The plate is between 1/16" and 3/16" thick and is typically, but not necessarily, stainless steel. The metal studs, which, advantageously, are also made from stainless steel, are less than ⅛" in diameter and up to about ½" long. The means to affix these studs are varied and include welding, riveting, or other techniques. The resulting metal assembly then is embedded in non-conductive material, e.g. plastic 2 (shown in broken outline only in FIG. 2(a)) by any of the previously described methods to create the integrated cathode unit shown in FIG. 2 and having the external appearance depicted in FIG. 5, of flat conductive metal islands flush with the surface of the non-conductive slab 2. The studs provide adequate gripping sites for the plastic 2 but to promote superior interlocking of the metal assembly and the plastic, it is advantageous to provide for a continuum of the plastic through the metal assembly, for example, by perforating the steel plate at a multiplicity of locations between the projections, one such perforation 16 being shown in FIG. 2.

The third embodiment of the invention (corrugated-wire) uses the conductive metal assembly illustrated in FIG. 3. In this embodiment, the metal assembly is composed of a series of corrugated metal wires 10 attached to an end frame 11 in such a way that the wires are substantially parallel and the peaks of the corrugations are staggered. Cross-members 12 may provide temporary support and spacing means before the assembly is embedded in a non-conductive material. Electrical contacts 3 are attached to the end-frame. The corrugated wires are of similar composition to the studs described hereinabove and have diameters between ⅛" and ⅜". The metal assembly is embedded in a slab of non-conductive material using a modification of the moulding techniques described earlier. The sides of the mould, or steel backing sheets, in this case are pre-lined with rubber, or other soft material that allows the peaks of the wire corrugation to be depressed therein. This technique provides an integrated cathode unit having raised islands as shown, in section, in FIG. 4(a). The peaks of the corrugations protrude through the plastic thereby creating elliptical islands 13 raised above the non-conductive slab 2.

Figure 4A:
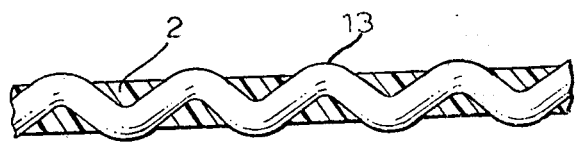
FIG. 4(a) shows a section of a portion of the cathode unit produced from the assembly of FIG. 3.
Figure 4B:
FIG. 4(b) illustrates a modification of the embodiment depicted in FIG. 4(a).

FIG. 4(b) illustrates a modification of the embodiment in which the raised islands of FIG. 4(a) are truncated, by grinding for example, to form flat elliptical islands 14 on the non-conductive slab 2.

Figure 4C:
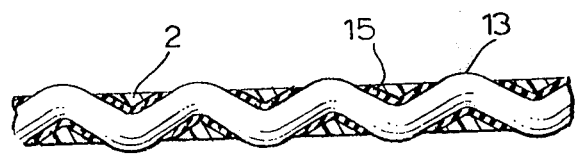
FIG. 4(c) is a sectional view of a modification of the embodiment described in FIG. 4(a).

All the embodiments of the cathode described hereinabove can be modified by the application of a soft deformable plastic or rubber-like material to the metal assembly prior to its being embedded in the slab. The deformable material provides a zone between the conductive metal assembly and the plastic in which it is embedded. A suitable material is provided by, for example, a vinyl resin dispersed in a non-volatile plasticizer, known in the art as a plastisol, although it should be understood that any substance having similar properties is potentially usable. The resulting cathode unit, shown in FIG. 4(c) for the raised corrugated-wire embodiment has an elastic zone, 15, between the metal island 3 and the non-conductive slab material 2 around it.

The preceding description makes it clear that all the embodiments and modifications of the integrated cathode unit of the present invention share a common distinguishing feature. The part of the conductive metal island that interfaces with the plastic is either flush with or raised above the surface of the plastic. The interface zone is crucial to the cathode unit because it is the site that is subject to the most wear during the removal of electrodeposits. Thus, the metal islands may have any configuration provided their surface is flush with or slightly above the surface of the plastic.

FIG. 5 is a general external representation of the cathode unit contemplated by the present invention showing conductive metal islands 1 integrated with a slab of non-conductive material 2. Electrical connections 3 provide current to the islands for electrodeposition of metal thereon.

It will be appreciated by skilled practitioners in this field that the use of the flat island modifications of any of the embodiments of the integrated cathode unit described herein are particularly advantageous because of the simplicity with which a fresh working surface can be created when repair is indicated. A simple sanding, grinding, buffing or similar technique removes worn or damaged material and generates a fresh cathode surface. This simple restoration feature of the present invention takes on added significance when, as described hereinafter, evidence is available which shows that the cathode unit of the present invention readily outperforms the prior art cathodes in service life between repairs.

In using the cathode unit in a preferred electrolytic method to produce metal, it has been discovered, quite surprisingly, that a unique, crown-shaped product results when the island areas are less than about 0.2 square inches. The crown-shaped deposits resulting from electrodeposition on circular and elliptical islands are shown in FIGS. 6(a) and (b) respectively, with midpoint sections of the deposits being illustrated in FIGS. 6(c) and (d).

The crown-shaped product has a large component of growth in the direction normal to the cathode surface. It is convenient, therefore, to quantitatively describe the shape of the electrodeposit by assigning a shape parameter, S, defined as the height of the deposit, h, divided by its basal area, A. Thus, referring to FIG. 6(c).

$$S = h/A = (4h/\pi d^2$$

For crown-shaped electrodeposits, the shape parameter, S, is at least 0.3 in $^{-1}$ and commonly about 0.45$^{31\ 1}$. In contrast, electrodeposits grown on islands greater than about 0.20 square inches in area are button-shaped and typically have a value of S of only about 0.2 in$^{-1}$ or lower.

It will be appreciated from FIG. 6 that the crown-shaped product of the present invention is characterized by a size which is several times larger than the islands on which they were grown. In contrast, it is known that the button-shaped product is recovered in sizes corresponding substantially to the size of the conductive islands. The weight of the crown deposit is kept between about 5 g and 50 g by controlling the length of the plating period. For deposits below about 5 g in weight the cathodes require cycling about every two days and the original labour-saving advantage of the cathode tends to be lost. Above the 50 g, the deposits are so thick there is danger of contact with the corresponding anode.

The shape of the product and its size relative to the conductive island is of significant practical importance. Thus, the crown-shaped deposits of the present invention show a large component of growth in a direction normal to the plating surface as distinct from basal growth, which is defined as growth parallel to the plating surface. The plating of metal on cathodes having conductive islands is normally limited by touching of adjacent deposits as a result of basal growth between the conductive islands. For a given basal diameter, therefore, by virtue of its increased height, a crown-shaped product can be significantly heavier than a disc-shaped product. Accordingly, the plating cycles can be much longer, for example 2 weeks instead of the more conventional one week, and the frequency with which the cathodes must be stripped of their deposits is correspondingly decreased. The longer plating cycle is of great practical advantage because it reduces operating costs in the method while, at the same time, it increases the service life of the cathode unit.

A further advantage of the crown shape of the electrodeposits of the present invention is its relatively large surface area. This characteristic is beneficial to dissolution rates in plating or melting operations. The substantially hemispherical shape of the deposits has a theoretical surface area of $3\pi r^2$, where r is the basal radius. This is a 50% larger area than obtained with a button-shaped deposit of equivalent radius. The actual increase is probably far greater than 50% because of the convoluted texture of the crown shapes as shown in FIG. 6.

Whereas the preferred method of the present invention makes use of island areas less than 0.20 square inches and more than about 0.02 square inches, this does not have to be the case. It will be appreciated that all the benefits and advantages of the rugged cathode unit described herein apply equally to electrdeposition methods which employ island areas greater than 0.20 square inches.

A further advantage to be gained from the integrated cathode unit and method of the present invention lies in its potential for automation. This potential exists primarily because the integrated cathode units of the present invention are exceptionally rugged, require no pretreatment before plating, such as roughening the surface, and are capable of very long service life. Thus it is conceived that the product stripping process could be conducted within the electrolytic tanks from which the crown product would be subsequently recovered without need for removal of the cathode units.

The cathode unit and method of the present invention can be applied to the production of any base metal but advantageously to the electrodeposition of nickel, cobalt and copper or alloy composition thereof.

The following examples indicate the nature and advantages of the invention.

EXAMPLE 1

Two corrugated-wire cathode units, one prepared according to the corrugated-wire modification in which the surface is ground to expose flat islands (cathode A), and the other according to the modification of raised islands (cathode B), both measuring approximately 41" × 25" × ½" thick (excluding electrical contacts) and having about 1,650 304 stainless steel elliptical conductive islands each approximately ⅜" on its major dimensions and 3/16" on its minor dimensions and surrounded by non-conductive epoxy resin, were installed between insoluble anodes in the production tank of a nickel electrowinning operation.

The electrolyte composition was as follows:
$Ni^{2+}$: 68.9 g/L
$SO_2^{2-}$: 49.6 g/L
$Cl^-$: 89.7 g/L
$Na^+$: 27.0 g/L
$H_3BO_3$: 14.6 g/L and it had a pH of 2.5 at the operating temperature of 60° C. To control the initial growth of the deposits, the current to the cathode units was increased in steps for the first three days and thereafter maintained substantially constant for the remaining four days of deposition as seen in Table I.

TABLE I

| Day | Current Levels During Plating Cycle Current (Amps/Cathode) | |
|---|---|---|
| | Cathode Unit A | Cathode Unit B |
| 1 | 80 | 90 |
| 2 | 140 | 150 |
| 3 | 260 | 270 |
| 4 | 260 | 270 |
| 5 | 260 | 270 |
| 6 | 265 | 270 |
| 7 | 270 | 185 |

The starting current density for cathode unit A was about 126 A/ft² and for cathode unit B 142 A/ft². The voltage at 200 amps was 2.65V.

After seven days of electrodeposition the two cathode units were removed from the production tank and the nickel deposits were readily separated from the surface by use of a scraper. The shape of the deposits was uniform and approximately semi-ellipsoidal. The average weight was 22 grams and the semi-ellipsoid dimensions averaged 1⅛" diameter at the base with an overall height of ⅝" measured normally from the slab surface. The base of each deposit, therefore, had an area about seven times larger than that of the original conductive island. The cathode units were inspected after the deposits had been removed and it was found that none of the epoxy encapsulating material had dislodged during removal of the deposits.

EXAMPLE 2

Cathode units manufactured according to the present invention were reused repeatedly according to the method described above and their long service life without need for repair is demonstrated below.

The following laboratory-scale tests were run using cathode units representing the various flat island modifications of the corrugated and stud-wire embodiments described herein. The electrolyte was similar to that of Example 1, each cathode unit measured about 13½" × 6½" × ½" thick and the conducting medium in all cases was 304 stainless steel. The corrugated-wire units had 108 elliptical conductive islands with an average area of about 0.07 in² and the stud-wire cathode units had 154 circular islands each ¼" in diameter and having an area of 0.049 in². The overall island area was, therefore, approximately constant for all cathodes at about 7.5 in². The starting current was 7.5 amps which corresponded to a starting current density of about 144 A/ft². This current density decreased as plating occurred due to the three-dimensional growth of the deposit, and was estimated to be about 20 A/ft² at the end of the plating cycle. Three plating cycles were completed each week and thus each cycle had a total current feed of 22.5 amp-days.

After each plating cycle, the cathode units, with attached deposits, were removed from the electrolytic tank, water rinsed, and lightly scraped to detach the deposits. The cathode units were then returned to the electrodeposition operation for the next cycle. The service life of the cathode unit was defined by the number of plating cycles achieved by a given cathode unit before the surface required repair.

TABLE II
Service Life of Various Cathode Units

| Test | Cathode Type Metal Assembly | Slab | Plating Cycles |
|---|---|---|---|
| C | Uncoated Corrugated-Wire | Polyethylene | 34 |
| D | Uncoated Corrugated-Wire | Polypropylene | 35 |
| E | Plastisol Coated Corrugated-Wire | Araldite and Hycar CTBN* | 60 |
| F | Uncoated Stud-Wire | Polypropylene | 90 |
| G | Plastisol Coated Stud-Wire | Araldite and Hycar CTBN | 120 |

*Araldite is the trade mark identifying an epoxy resin and Hycar CTBN is a trade mark identifying a rubberizer additive.

It is seen from Table II that the cathodes of the present invention are all characterized by a much longer plating life than those of the prior art.

EXAMPLE 3

A series of deposition tests were run on two cathodes having islands of two respectively different sizes. Each cathode was used to plate 14 g deposits under two different starting current densities. The electrolyte was similar to that of Example 1. The results are shown in Table III.

TABLE III
Effect of Starting Current Density and Island Size on Product Shape

| Island Diameter (in) | Starting Current Density (A/ft$^2$) | Shape Factor S, (in$^{-1}$) |
|---|---|---|
| 5/8" | 50 | .24 |
| 5/8" | 200 | .22 |
| 5/16" | 50 | .46 |
| 5/16" | 200 | .43 |

The electrodeposits from the ⅝" diameter islands were disc-shaped, virtually identical in overall shape and differed only in the surface texture. The electrodeposits formed on the smaller islands were both crown-shaped and qualitatively distinct from the disc-shaped deposits.

This example shows clearly that the crown-shape of the product, and its associated advantages, is not due to operating at the higher current density that attends the use of a smaller island, but results intrinsically from the absolute size of the island itself.

EXAMPLE 4

Additional tests were run, similar to those of Example 3, but using a constant island size of 7/16" and a constant current density of 200 A/ft$^2$. Deposition times, however, were varied thereby giving rise to deposits of different weights. This test thus stuudied the effect of deposit weight on deposit shape.

The results are shown in Table IV.

TABLE IV
Relationship Between Electrodeposit Weight and Shape

| Deposit Weight g | Shape Factor S (in$^{-1}$) |
|---|---|
| 5 | .35 |
| 15 | .34 |
| 30 | .31 |

This example shows that the deposits retain a roughly constant shape factor as they grow. It is evident, therefore, that these results, taken in conjunction with those of Example 3, show that the absolute island size is the most important variable in determining product shape. The two examples also serve to define the limits of the invention. Example 3 showed that button-shapes resulted from deposition on ⅝" diameter islands and the present Example, in contrast, shows that a 7/16" diameter island yields a crown deposit. A practicable cut-off limit for island sizes for deposition of crowns according to the present invention appears, therefore, to be a diameter of about ½", or equivalently, an area of about 0.20 in$^2$.

EXAMPLE 5

A cathode was manufactured according to the modification of the plastisol-coated corrugated wire embodiment using raised islands rather than the flat islands described in Example 2. The matrix material was a mixture of Araldite with Hycar CTBN. All electrodeposition parameters, including current density, were similar to those of Examples 1 and 2. The cathode lasted 56 cycles and yielded deposits that were even more readily removed than those from cathodes having the flat island modification. The product deposits, apart from a depression in the base corresponding to the raised islands, were in all respects similar to earlier deposits.

EXAMPLE 6

A laboratory-sized cathode was constructed in which a stud-wire assembly with a plastisol coating was embedded in a plastic slab of Araldite with Hycar CTBN. The cathode had 154 islands on its surface, each 5/16" in diameter.

The cathode was immersed in a cell containing an electrolytte similar to that of Example 1. A current of 16.5 amps was fed to the cell which corresponded to a starting current density of 210 A/ft$^2$. Electrodeposition of nickel was continued for a 14 day period after which the cathode and deposits were removed from the tank and the deposits removed by a light scraping action.

None of the deposits had bridged and they were all crown-shaped with excellent surface uniformity. Their average weight was about 34 grams and typical measurements were about ⅝" diameter at the base and 7/16" in height.

EXAMPLE 7

A cathode with 5/16" diameter islands was constructed from a 304 stainless steel plate-stud metal assembly embedded in polyurethane. The cathode was immersed in a cell containing an electrolyte similar to that of Example 1 under a current of 16.5 amps which corresponded to a starting current density of 210 A/ft$^2$. Three electrodeposition cycles were conducted each week with each cycle being terminated by strippping of the nickel electrodeposits in the manner previously described. The cathode had lasted 40 cycles at time of writing and showed no evidence of deterioration.

Example 8

A deposition test was run on a cathode having 5/16" diameter islands. The cathode was placed in a cell containing a copper-bearing sulphate electrolyte and copper was plated on the islands up to a weight of about 30 grams using a starting current density of 140 A/ft$^2$. The test was repeated using ⅝" diameter islands. The deposits grown from the 5/16" islands were crown-shaped and had an S factor of 0.4 in$^{-1}$ whereas the ⅝" islands deposits were disc-like and had an S factor of 0.22 in$^{-1}$.

EXAMPLE 9

A deposition test was run, similar to that of Example 8, but employing a cobalt chloride electrolyte. The resulting cobalt deposits were very similar in shape to the copper deposits of Example 8 and to nickel deposits plated under the same conditions. The conclusion is therefore drawn that the method of the present invention can be applied to he electrodeposition of copper and cobalt.

What we claim is:

1. The method of electrodepositing a multiplicity of discrete metal electrodeposits from an electrolyte, said method characterized by:
   i. employing in said electrolyte a reusable cathode unit having two working faces and comprising an integrated whole of two interlocking parts, a substantially rigid slab of non-conductive material with a conductive metal assembly embedded therein, said assembly having projections at spaced locations that penetrate the surface of the slab thereby forming an array of solid, conductive metal islands, each metal island having a surface area of less than about 0.2 square inches and more than about 0.02 square inches and being flush with or raised above the surface of the slab and separated from each other sufficiently for the electrodeposition of discrete metal deposits thereon, each of which has a basal area several times larger than that of the island on which it is deposited,
   ii. passing electric current through the electrolyte,
   iii. electrodepositing metal on said cathode unit thereby producing individual metal deposits, weighing at least 5 g but not more than 50 g,
   iv. removing the deposits from the cathode unit,
   v. reusing the cathode unit in the electrolyte for further metal electrodeposition.

2. The method according to claim 1 in which nickel metal is electrodeposited from a nickel-containing electrolyte.

3. A cathodically deposited metal product of substantially hemi-spherical or semi-ellipsoidal shape having a flat base of area A and a maximum height, h, measured perpendicularly from the flat base, the product weighing between 5 g and 50 g, having a total surface area at least three times that of its base and a ratio h/A of at least $0.3 \text{ in}^{-1}$ when prepared according to the method of claim 1.

4. Product according to claim 3 in which the metal is nickel, electrodeposited from a nickel-containing electrolyte.

5. Product according to claim 3, in which the metal is copper, electrodeposited from a copper-containing electrolyte.

* * * * *